United States Patent [19]

Shaberman et al.

[11] Patent Number: 5,761,732
[45] Date of Patent: Jun. 2, 1998

[54] INTERLEAVING FOR MEMORY CARDS

[75] Inventors: Tony Shaberman, Roseville, Calif.; Sean Casey, Singapore, Singapore

[73] Assignee: Intel Corporation, Santa Clara, Calif.

[21] Appl. No.: 672,679

[22] Filed: Jun. 28, 1996

[51] Int. Cl.$^6$ .................................................. G06F 12/00
[52] U.S. Cl. .................. 711/157; 711/158; 711/163; 711/161; 711/153; 711/152; 711/127; 711/131; 711/5
[58] Field of Search .................. 395/484, 442, 395/430, 405; 365/52; 235/492

[56] References Cited

U.S. PATENT DOCUMENTS

| | | | |
|---|---|---|---|
| 4,740,911 | 4/1988 | Shar et al. | 395/484 |
| 5,025,415 | 6/1991 | Masuyama et al. | 365/52 |
| 5,260,555 | 11/1993 | Sakamoto | 235/492 |
| 5,261,068 | 11/1993 | Gaskins et al. | 395/484 |
| 5,293,607 | 3/1994 | Brockmann et al. | 395/405 |
| 5,428,762 | 6/1995 | Curran et al. | 395/442 |
| 5,497,478 | 3/1996 | Murata | 395/484 |
| 5,530,828 | 6/1996 | Kaki et al. | 395/430 |

OTHER PUBLICATIONS

"Computer Architecture A Quantitive Approach", John L. Hennessy and David Patterson, 1990, pp. 429–431.
*Miniature Card Specification*, Release 1.0, Feb. 29, 1996, Intel Corporation (1995,96).

*PC Standard*, Release 2.0, Sep. 1991, Personal Computer Memory Card International Association.

*Primary Examiner*—Tod R. Swann
*Assistant Examiner*—Fred Fei Tzeng
*Attorney, Agent, or Firm*—Blakely, Sokoloff, Taylor & Zafman

[57] ABSTRACT

A method and apparatus for interfacing a memory card with a system having a smaller bus width while maintaining its interchangeability with other systems having larger bus widths. The host accesses data stored in the memory card using an interleaving scheme, such as a two-way interleaving scheme. The host provides a first enable signal and a second enable signal. In response to the first enable signal, data is accessed from a first section of the addressed memory location, and in response to the second enable signal, data is accessed from a second section of the addressed memory location. The first section of the addressed memory location may store even data bytes and the second section of the addressed memory location may store odd data bytes. The host may only access one section of the selected memory location at a time when using the interleaving scheme.

16 Claims, 4 Drawing Sheets

| A₀ | CS# | CEL# | CEH# |
|----|-----|------|------|
| 0  | 0   | 0    | 1    |
| 0  | 1   | 1    | 1    |
| 1  | 0   | 1    | 0    |
| 1  | 1   | 1    | 1    |

INTERLEAVING FOR MEMORY CARDS

FIELD OF THE INVENTION

The present invention pertains to the field of integrated circuits. More particularly, the present invention relates to the field memory cards.

BACKGROUND OF THE INVENTION

The proliferation of hand held personal computers (PCs), digital cameras, audio recorders, smart cellular phones and other hand held consumer products have created an extensive market for small form factor memory cards. Typically, these hand held consumer products require that the small form factor memory cards provide a consumer-friendly data storage media that conveniently transports data from the hand held consumer product to a personal computer or other data processing system for manipulation and enhancement.

Currently, some small form factor memory cards maintain their interchangeability with systems having various bus widths by providing serial access to the data stored in the small form factor memory cards. This approach provides a much slower access time than accessing several data bits in parallel (i.e., a byte of data or a word of data).

Other memory cards or modules, such as the Personal Computer ("PC") Cards having a 16-bit bus that adheres to the Personal Computer Memory Card International Association ("PCMCIA") specifications, may be accessed by an 8-bit system using a byte swapping scheme. (See PC Card Standard, Release 2.0, Sept. 1991, Personal Computer Memory Card International Association). Typically, a byte swapping scheme accesses the low byte data stored in the PC Card from a low byte memory location. However, the high byte data stored in the PC Card is shifted to the low byte memory location to be accessed. Therefore, the low byte of data and the high byte of data are both accessed from the low byte memory location.

Although byte swapping is a viable solution for PC Cards, there is a disadvantage to implementing byte swapping in small form factor memory cards having physical dimensions smaller than the PC Card, such as the Miniature Card which is about a fourth of the size of a PC Card. In particular, a byte swapping scheme typically requires additional logic (often implemented with an application specific integrated circuit) which typically consumes additional space on the memory card and typically increases the manufacturing cost.

Interleaving, typically refers to the partitioning of the memory into separate banks such that each memory bank is independently accessed. The interleaving of addresses among M memory banks is referred to as M-way interleaving. For example, if an interleaving scheme is used to interleave two memory banks, the interleaving scheme is referred to as a two-way interleaving scheme.

Memory interleaving is commonly used to address the main memory in a system. By partitioning the main memory into multiple memory banks and storing successive words in different memory banks, data stored in each memory bank may be accessed in parallel to improve the main memory access time. (See pages 429–431 of "Computer Architecture A Quantitative Approach" by John L. Hennessy and David Patterson (Morgan Kaufman Publishers, Inc., 1990)). For example, if the main memory is partitioned into four memory banks and the main memory is sequentially addressed, then four consecutive memory locations may be read simultaneously if each addressed memory location is stored in a different memory bank. Because parallel access to the different memory banks is possible, the average rate of fetching data stored in the main memory may be increased.

SUMMARY OF THE INVENTION

One object of the present invention is to provide an interleaving scheme that allows a system to access data stored in a memory card having a larger bus width than the system.

Another desire is to maintain the interchangeability of the memory card with systems having various bus widths.

Another desire is to access multiple data bits stored in the memory card in parallel, rather than in a serial fashion while maintaining the memory cards interchangeability with systems having various bus widths.

An apparatus which includes a socket for accepting a memory card is described. The apparatus includes a first enable output, a second enable output and N data I/Os. The first enable output provides a first enable signal and the second enable output provides a second enable signal. The first enable signal and the second enable signal are not asserted simultaneously. The N data I/Os provides or receives the data stored in a first section of an addressed memory location within the memory card in response to an asserted first enable signal. The N data I/Os provides or receives data stored in the second section of the addressed memory location within the memory card in response to an asserted second enable signal.

A method for accessing data stored in a memory card by a system having a smaller bus width than the memory card is described. A plurality of address signals are provided to the address inputs of the memory cards. A first section of an addressed memory location is enabled, independently of a second section, of the addressed memory location. Data stored in the first section of the addressed memory location is accessed. The second section of the addressed memory location is enabled, independently of the first section, of the addressed memory location. Data stored in the second section of the addressed memory location is accessed.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The present embodiment provides an M-way interleaving scheme to access data from a small form factor memory card (including a Miniature Card) by a system having a smaller bus width. For one embodiment, a two-way interleaving scheme allows a system having an 8-bit data bus ("×8 system") to record data and allows a system having a 16-bit data bus ("×16 system") to read or modify the same data. For this embodiment, the small form factor memory card stores 16 bits of data in each memory location and has 16 data input/outputs ("I/Os") in which either a ×8 system or a ×16 system may access the data. Therefore, a ×16 system is capable of accessing a data word from each memory location in a single read or write cycle while a ×8 system is capable of accessing either a high byte of data or a low byte of data from each memory location in a single read or write cycle.

For an alternative embodiment, the present interleaving scheme may be a two-way interleaving scheme used to access data stored in a small form factor memory card having a 32-bit bus ("×32 small form factor memory card") by a ×16 system, or some other system configuration in which the system has a bus width that is half the size of the bus width of the small form factor memory card. The present interleaving scheme also includes other M-way interleaving schemes such as a four-way or an eight-way interleaving scheme. For example, if the data stored in a small form factor memory card having a 32-bit bus is accessed by a ×8 system, then a four-way interleaving scheme may be implemented in an alternative embodiment.

Although interleaving commonly refers to an addressing scheme that improves the system performance (i.e., memory access time) of the main memory, the interleaving scheme in the present embodiment is directed at maintaining the interchangeability of the small form factor card with systems having the same size or smaller size bus widths. Unlike the memory interleaving scheme used to improve the main memory access time (i.e., by accessing the different memory banks simultaneously), the interleaving scheme in the present embodiment individually (i.e., not simultaneously with other memory banks) accesses each memory bank in the small form factor card when the small form factor memory card is interfacing with a system having a smaller bus width than the small form factor memory card. This ensures that the entire memory array in the small form factor card may be accessed by the host despite the fact that the bus width of the host has a smaller data bus (or bandwidth) than the memory card.

The present interleaving scheme may also improve the write performance to the small form factor memory card. A two-way interleaved write by a ×8 system to a ×16 small form factor memory card (with two ×8 devices) may have twice the throughput as single writes by a ×8 system to ×8 small form factor memory card. For example, a flash memory system requires 100 ns to send a write command and has a byte write time of about 6–10 microseconds (μs). The two-way interleave scheme accesses odd-numbered data bytes independently from the even-numbered data bytes using separate card select signals. Therefore, if the processor accesses an even-numbered location, it may then access an odd-numbered location immediately, without having to wait the entire write cycle and vice versa. Because data is often recorded through sequential, odd-and-even memory addresses, an interleaved memory maximizes the write throughput.

The Miniature Card is a small form factor memory card or memory module that supports many different markets and applications. (See Miniature Card Specification, Release 1.0, published Feb. 29, 1996 by Intel Corporation). Currently, the Miniature Card supports a variety of technologies (e.g., Flash, Read-Only-Memory ("ROM"), One-Time Programmable Read-Only Memory ("OTPROM"), Electrically Erasable Programmable Read-Only Memory ("EEPROM"), Dynamic Random Access Memory ("DRAM") and Static Random Access Memory ("SRAM")) within a small form factor card. Although the Miniature Card specification currently defines the Miniature Card as having the physical dimensions of 38 millimeters (mm)×33 mm×3.5 mm, the Miniature Card specification may be extended to support other technologies and other package sizes. Its high performance, small size and simple interface provides an ideal memory solution for hand held devices. For example, the Miniature Card is well suited for consumer devices such as hand held PCs, digital cameras, audio recorders and smart cellular phones that require small, consumer-friendly data storage media, and a convenient method for transporting data to a PC for manipulation and enhancement.

The Miniature Card interface is designed to support two types of memories: standard and DRAM. As such, host sockets can be designed to operate with both types of cards. The standard type of Miniature Cards typically including Flash, ROM and EEPROM devices which use the output enable and the write enable signals to respectively read from and write data to the Miniature Card, and the card enable signals to select the low byte or high byte of data for reading and writing data. Although the DRAM Miniature Cards use the same output and write enable signals for reading and writing, the row address strobe signal is used for selecting the card.

Flash memories are particularly suitable for many of the hand held or embedded type applications. Flash memories may provide an alternative solution to the traditional PC storage media which includes ROM, DRAM, floppy disk and hard disk. In other words, flash memories enable the design of completely new types of computers that fit in the palm of a person's hand by replacing many of the code and storage functions of other traditional PC storage media.

Consumer-friendly connections between a Miniature Card having a flash memory array ("Flash Miniature Card") and another system are typically achieved through host-resident software, such as Flash Translation Layer ("FTL"). FTL is a robust, widely accepted flash manager that is available from a multitude of sources. In other words, FTL has a widely accepted file format that maintains the interchangeability of the Flash Miniature Card between systems having an 8-bit data bus, systems having a 16-bit data bus, and PC Card slots having a 16-bit data bus, by taking the disk drive specific software requests and converting or translating them to flash media accesses.

More specifically, FTL is a sector based flash manager that provides logical to physical sector translation. FTL performs sector mapping to allow a flash memory array to appear as a drive-like, sectored, rewrite "in place" type storage media. While the host file system sees the Flash Miniature Card as a continuous sectored medium, FTL relocates these sectors transparently to the operating system, and tracks the logical-to-physical relationship.

One embodiment provides a two-way interleaving scheme that allows a ×8 system running the FTL file format to access a ×16 Flash Miniature Card while maintaining compatibility with a ×16 system. For example, the Flash Miniature Card may be inserted into a digital camera which requires an 8-bit bus. Once the digital camera records imaging data onto the Flash Miniature Card using the FTL file format, the Flash Miniature Card may be removed from the digital camera and inserted into a ×16 system such as a personal computer. The ×16 system has the capability to read the data stored on the Flash Miniature Card using the FTL file format notwithstanding the fact that data was recorded by a ×8 system. The interchangeability between the ×8 system (e.g. digital camera) that records data using the FTL file format and the ×16 system (e.g. personal computer) that accesses the data using the FTL file format is maintained by providing a host or an interface for the ×8 system that incorporates a two-way interleaving scheme.

The Flash Miniature Card implements the two-way interleaving scheme by dividing each memory location into a high byte memory location and a low byte memory location which may be accessed independently from each other. Therefore, for one embodiment, all even bytes of data are stored in the low byte memory locations and are accessed by an asserted low byte enable signal and all odd bytes of data are stored in the high byte memory locations and are accessed by an asserted high byte enable signal.

The flash memory array in the Flash Miniature Card having 16 data bits ("×16 Flash Miniature Card") in each memory location may include ×16 flash devices or ×8 flash devices. The two-way interleaving scheme used in conjunction with a ×16 Flash Miniature Card is, however, only applicable to a ×16 Flash Miniature Card implemented with ×8 flash devices. If the flash memory array in the ×16 Flash Miniature Card includes ×16 flash devices, then each memory location stores a word of data having a high and a low byte. On the other hand, if the flash memory array in the ×16 Flash Miniature Card includes two ×8 flash devices, then a first ×8 flash device stores high bytes of data and a second ×8 flash device stores low bytes of data. For one embodiment, the ×16 flash memory array is capable of storing up to 32 Megawords (64 Megabytes) of data.

Figure 1:
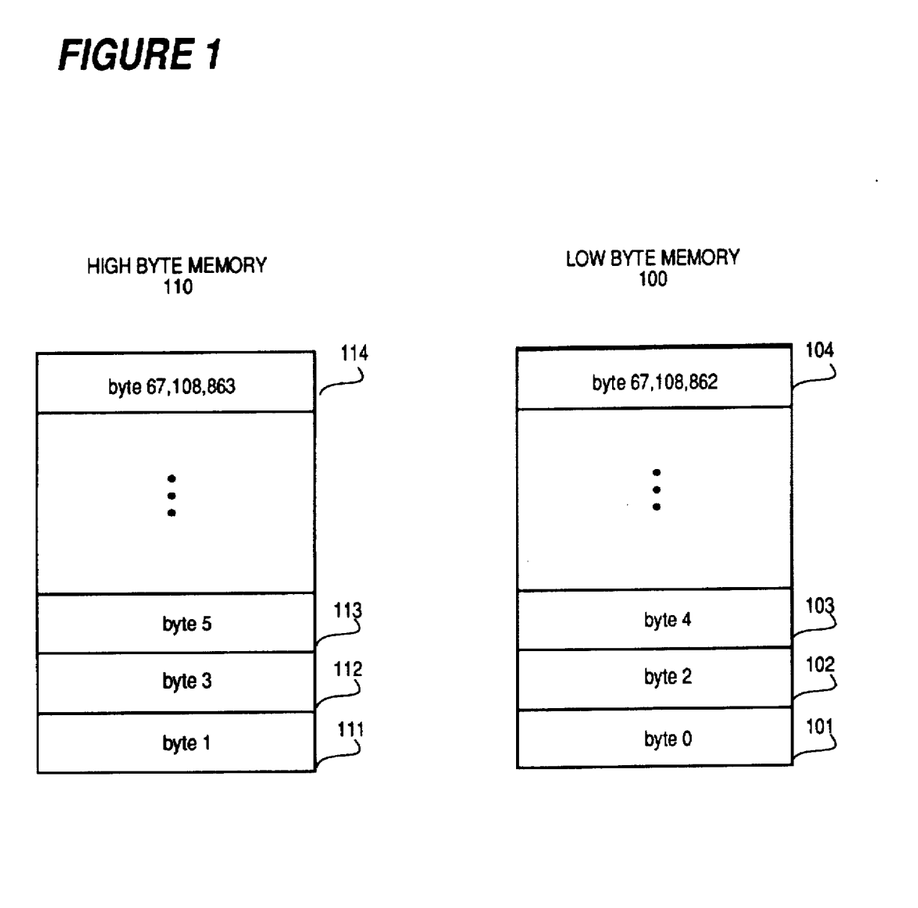
FIG. 1 illustrates one embodiment of a memory array in a Miniature Card.

FIG. 1 illustrates one embodiment of a memory array in a ×16 Miniature Card. According to FIG. 1, the ×16 memory array includes a high byte memory 110 and a low byte memory 100 wherein each byte of memory stores 8 bits of data. Currently, the Miniature Card is defined as having a 16-bit bus; however, the Miniature Card may later be defined to include other bus sizes, such as a 32-bit bus. Although ×16 Miniature Cards may be implemented with ×16 memory devices or ×8 memory devices, the interleaving scheme for ×16 Miniature Cards is only applicable to ×16 Miniature Cards having ×8 memory devices. Assuming that the memory array stores 64 megabytes of data, (67,108,864 bytes) then both the low byte memory 100 and the high byte memory 110 each have 225 (33,554,432) memory locations.

According to FIG. 1, the memory locations 101, 102, 103 and 104 are located in the low byte memory 100 and the memory locations 111, 112, 113 and 114 are located in the high byte memory 110. By storing the lower data bytes (i.e., even bytes of data) of each memory word in the low byte memory 100 and storing the upper data bytes (i.e., odd bytes of data) of each memory word in the high byte memory 110, the memory array is capable of storing data words. For example, the first word stored in the memory array may include data bytes 0 and 1, the second word stored may include data bytes 2 and 3, the third word stored may include data bytes 4 and 5 and the last word stored may include data bytes 67,108,862 and 67,108,863.

Therefore, when accessing data from the Miniature Card by a ×16 system, the low and high data bytes are accessed simultaneously. On the other hand, when reading from or writing to the Miniature Card by a ×8 system, the even data bytes stored in the low byte memory 100 are accessed independently from the odd data bytes stored in the high byte memory 110.

Figure 2:
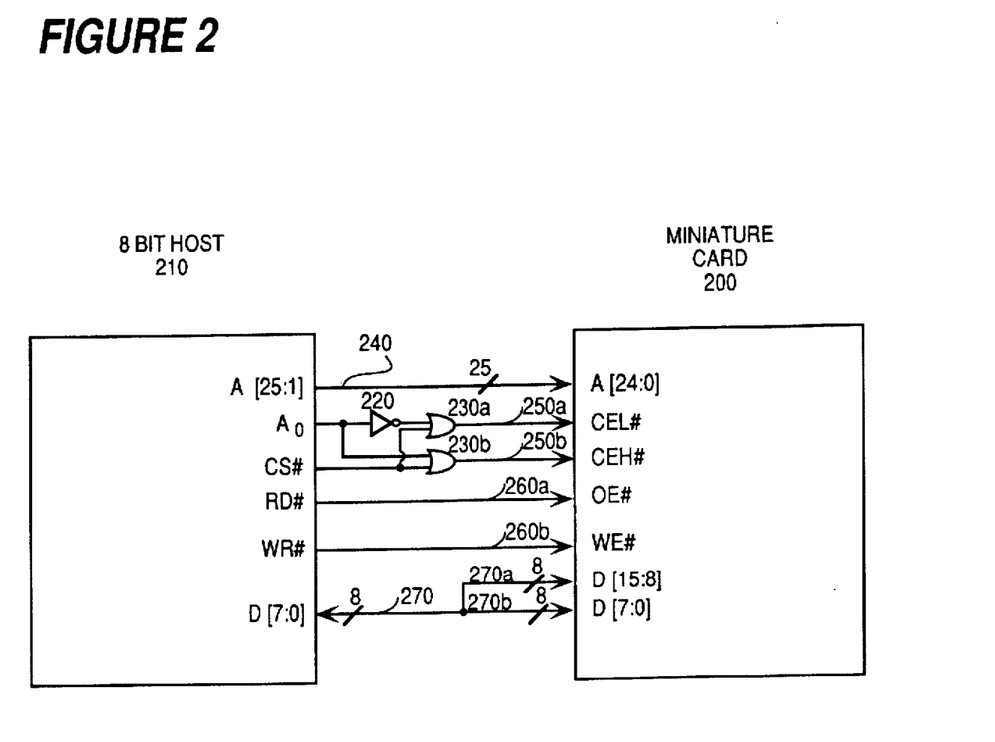
FIG. 2 illustrates one embodiment of an interface between an 8-bit host and a Miniature Card.

FIG. 2 illustrates one embodiment of an interface between a Miniature Card 200 having two ×8 devices and an 8-bit host 210. The Miniature Card interface includes address inputs, data input/outputs (I/Os), control inputs and a data bus width indicator input. In one embodiment, the address inputs A[24:0] receives 25 signals that can address up to 32 Megawords (64 Megabytes) of data and the 16 data I/Os D[15:0] are used to transfer data to and from the Miniature Card 200 via 16 non-multiplexed signals. The control inputs receive the output enable signal, the write enable signal, the card enable low byte signal and the card enable high byte signal that are provided by the ×8 host 210. The output signal and the write enable signal are used to read and write data to the card, and the card enable low byte signal and the card enable high byte signal are used to enable the high and low bytes of data from the card, respectively. The data bus width indicator signal indicates whether the data bus is 8 bits wide or 16 bits wide. Although the Miniature Card includes other inputs and outputs such as the voltage detection outputs, card detection outputs, and a reset input, further discussion of these signals are not necessary to illustrate the two-way interleaving scheme of the present invention.

According to FIG. 2, the 8-bit host 210 has 26 address outputs A[25:1] and A0, a chip select output CS#, a read output RD#, a write output WR# and 8 data I/Os D[7:0]. The address outputs A[25:1] of the 8-bit host 210 are coupled to the address inputs A[24:0] of the Miniature Card 200 over lines 240, the read output RD# of the 8-bit host 210 is coupled to the output enable input OE# of the Miniature Card 200 over line 260a and the write output WR# of the 8-bit host 210 is coupled to the write enable input WE# of the Miniature Card 200 over line 260b. In an alternative embodiment, the 8-bit host may provide one write/read (W/R#) output instead of separate read RD# and write WR# outputs.

For one embodiment, the address inputs A[24:0] of the Miniature Card 200 are coupled to the address outputs A[25:1] of the 8-bit host 210. Furthermore, the chip select signal from the CS# output and the lowest order address signal from the lowest order address output A0 are used to alternatively select the CEL# input and the CEH# input of the Miniature Card 200. The lower order address signal and the chip select signal provides the input signals to a byte control circuit that includes an inverter 220 and two OR gates 230a and 230b. The byte control circuit ensures that only one of the card enable inputs CEH# and CEL# of the Miniature Card 200 are asserted at a time.

The byte control circuit provides a low byte enable signal to the CEL# input of the Flash Miniature Card 200 over line 250a and a high byte enable signal to the CEH# input of the Miniature Card over line 250b. The lowest order address output A0 is coupled to the input of the inverter 220 which has its output coupled to a first input of the OR gate 230a. The lowest order address output A0 is also coupled to the first input of the OR gate 230b. The chip select signal is coupled to the second input of the OR gate 230a and the second input of the OR gate 230b. The output of the OR gate 230a is coupled to the CEL# input of the Miniature Card 200 and the output of the OR gate 230b is coupled to the CEH# input of the Miniature Card 200. It is appreciated that the byte control circuit may be incorporated into the 8-bit host or may be external to the 8-bit host. It is also appreciated that the byte control circuit may be implemented using other circuit configurations that independently select the CEL# and CEH# inputs of the Miniature Card 200.

Figure 4:
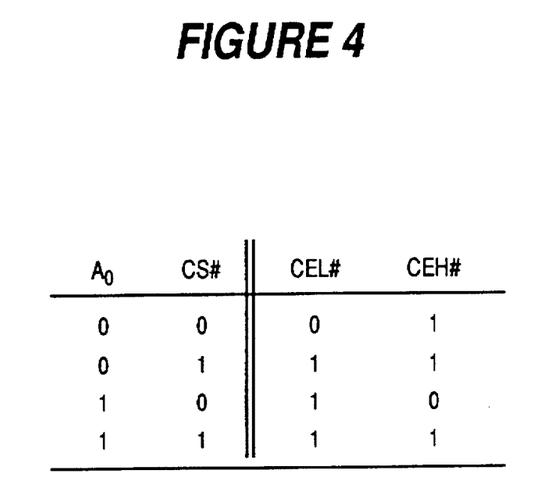
FIG. 4 illustrates a truth table for one embodiment of the byte control circuit.

FIG. 4 illustrates a truth table for one embodiment of the byte control circuit. For the following example, assume that the chip select output CS# is asserted with a logic "0" and deasserted with a logic "1". Therefore, when the chip select output CS# is asserted, the card enable input CEL# is selected when the lowest order address signal is at a logic "0" or, in the alternative, the card enable input CEH# is selected when the lowest order address signal is at a logic "1". On the other hand, when the chip select output CS# is deasserted, then neither the card enable input CEL# or CEH# is capable of being selected.

As mentioned above, the Miniature Card 200 has a 16 bit data bus that does not support byte swapping. However, by individually asserting the CEL# input and the CEH# input of the Miniature Card 200, a ×8 host 210 can access the entire Miniature Card 200 having two ×8 devices. This can be accomplished by connecting the lower data I/Os D[7:0] to the upper data I/Os D[15:8] of the Miniature Card. For example, D[0] is coupled to D[8], D[1] is coupled to D[9], D[2] is coupled to D[10], D[3] is coupled to D[11], D[4] is coupled to D[12], D[5] is coupled to D[13], D[6] is coupled to D[14] and D[7] is coupled to D[15]. Therefore, the eight data I/Os D[7:0] of the 8-bit host 210 are coupled to both the upper eight data I/Os D[15:8] of the Miniature Card 200 over data lines 270a and the lower data I/Os D[7:0] of the Miniature Card 200 over data lines 270b. When the CEL# input of the Miniature Card 200 is asserted, data is coupled to the lower data I/Os D[7:0] of the Miniature Card 200 and when the CEH# input of the Miniature Card 200 is asserted, data is coupled to the upper data I/Os D[15:8] of the Miniature Card 200.

Figure 3:
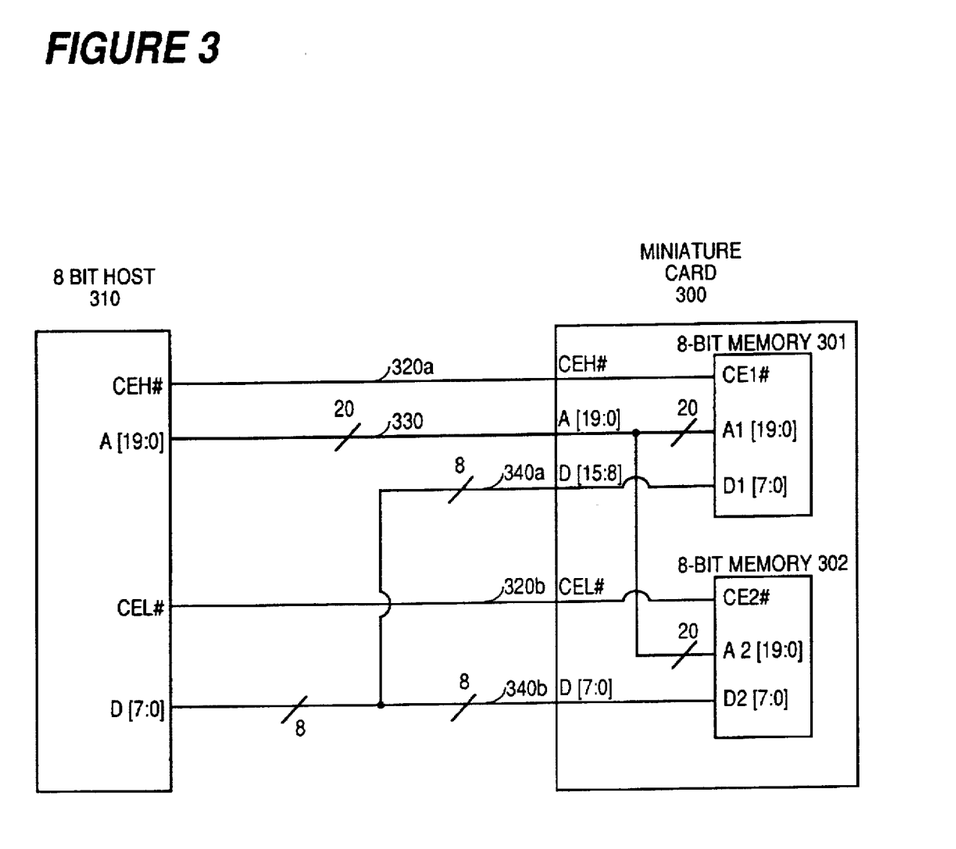
FIG. 3 illustrates another embodiment of an interface between an 8-bit host and a Miniature Card.

FIG. 3 illustrates an alternative embodiment of an interface between a Miniature Card 300 and an 8-bit host 310. According to FIG. 3, the Miniature Card 300 includes two 8-bit memory devices 301 and 302. The memory device 301 stores the high byte of each data word and the memory device 302 stores the low byte of each data word. The 8-bit host 310 has two card enable outputs CEH# and CEL#—one for enabling the high bytes stored in the memory device 301 and one for enabling the low bytes stored in the memory device 302. The high byte output CEH# of the 8-bit host 310 is coupled to the high byte input CEH# of the Miniature Card 300 over line 320a, and the low byte output CEL# of the 8-bit host 310 is coupled to the low byte input CEL# of the Miniature Card 300 over line 320b. The high byte input CEH# of the Miniature Card 300 is coupled to the chip enable input CE1# of the device 301 and the low byte input CEL# of the Miniature Card 300 is coupled to the chip enable input CE2# of the device 302. The 8-bit host 310 generates the card enable low byte signal and the card enable high byte signal such that the high byte input CEH# and the low byte input CEL# are not simultaneously asserted. Therefore, the 8-bit host 310 is prevented from accessing a data word from the Miniature Card 300 having ×8 devices. The 8-bit host includes circuitry and possibly software that generates the low card enable signal and the high card enable signal for accessing the low data bytes and the high data bytes, respectively.

The twenty address outputs A[19:0] of the 8-bit host 310 are coupled to the twenty address inputs A[19:0] of the Miniature Card 300 over lines 330. In one embodiment, the twenty address outputs A[19:0] and the twenty address inputs A[19:0] are coupled within the Miniature Card 300. The address inputs A1[19:0] of the memory device 301 are coupled to the address inputs A2[19:0] of the memory device 302 by coupling A1(0) to A2(0), A1(1) to A2(1), A1(2) to A2(2) and so forth until A1(19) is coupled to A2(19).

The low byte data A/Os D[7:0] of the Miniature Card 300 are tied to the high byte data I/Os D[15:8] of the Miniature Card 300. In one embodiment, the low data I/Os D[7:0] and the high data I/Os D[15:8] are coupled outside the Miniature Card 300. More specifically, D[0] is coupled to D[8], D[1] is coupled to D[9], D[2] is coupled to D[10], D[3] is coupled to D[11], D[4] is coupled to D[12], D[5] is coupled to D[13], D[6] is coupled to D[14], D[7] is coupled to D[15]. This allows the eight data I/Os D[7:0] of the 8-bit host 310 to be coupled to both the high byte data I/Os D[15:8] over lines 340a and the low byte data I/Os D[7:0] over lines 340b. The high byte data I/Os D[15:8] of the Miniature Card 300 are coupled to the data I/Os D1[7:0] of the memory device 301 and the low byte data I/Os D[7:0] of the Miniature Card 300 are coupled to the data I/Os D2[7:0] of the memory device 302. Therefore, data is accessed from a high byte of a memory location in the Miniature Card 300 in response to the high byte enable signal and data is accessed from a low byte of a memory location in the Miniature Card 300 in response to the low byte enable signal.

By individually asserting the CEL# input and the CEH# input of the Miniature Card, an 8-bit host may access the entire Miniature Card having ×8 devices. As mentioned above, the write enable signal received by the write enable input WE# of the Miniature Card and the output enable signal received by the output enable input OE# of the Miniature Card controls whether data is written into the Miniature Card or read from the Miniature Card, respectively. Therefore, when the WE# input of the Miniature Card is asserted, data may be written into the Miniature Card via the 8-bit host and when the OE# input the Miniature Card is asserted, data may be read from the Miniature card via the 8-bit host. More specifically, data is written into or read from a low byte of a memory location over the lower order address bits D[7:0] when the low byte card enable input CEL# is asserted and data is written into or read from a high byte of a memory location over the higher order address bits D[15:8] when the high byte card enable input CEH# is asserted.

For one embodiment, the card enable inputs are asserted with a logic "0" signal and deasserted with a logic "1" signal. Therefore, when CEH# receives a logic "1" signal and CEL# receives a logic "0" signal, the data inputs D[7:0] receive the low byte data provided the WE# input of the Miniature Card is asserted. Furthermore, the data inputs D[15:8] remain in a high impedance state until CEH# receives a logic "0" signal and CEL# receives a logic "1" signal. When this occurs, the data inputs D[15:8] receive the high byte data and the data inputs D[7:0] are held in the high impedance state.

On the other hand, when the OE# input of the Miniature Card is asserted, data may be read from the Miniature Card via the 8-bit host. In this scenario, the low byte data is read when the low byte card enable input CEL# is asserted over the data inputs D[7:0], and high byte data is read when the high byte card enable input CEH# is asserted over the data inputs D[15:8]. Therefore, when CEH# receives a logic "1" signal and CEL# receives a logic "0" signal, the 8-bit host reads the low byte data from the data inputs D[7:0], and the data inputs D[15:8] are held in the high impedance state. Similarly, when CEH# receives a logic "0" signal and CEL# receives a logic "1" signal, the 8-bit host reads the high byte data from the data inputs D[15:8] and the data inputs D[7:0] are held in the high impedance state.

By implementing a two-way interleaving scheme for a small form factor memory card, one embodiment provides for the interchangeability of a ×16 small form factor memory card between ×8 systems, ×16 systems, and PC card slots. A ×8 host can read or write to a ×16 small form factor memory card by independently asserting the two card enable inputs CEL# and CEH# of the ×16 small form factor memory card. The CEL# input receives the low byte card enable signal and the CEH# input receives the high byte card enable signal from the ×8 host such that data can be accessed from the ×16 small form factor memory card in a two-way interleaved fashion. If the ×8 bit host does not provide two card enable signals for controlling the CEL# and the CEH# inputs of the ×16 small form factor memory card, this functionality can be implemented with external logic. Furthermore, the two-way interleaving scheme also provides twice the write throughput over a single chip 8-bit card.

The programming aspect of the present embodiment may be conveniently implemented using a conventional general purpose digital computer programmed according to the teachings of the specification. The present embodiment thus also includes a computer program product which may comprise a storage medium including instructions which can be used to program a computer to perform a process according to the present invention. The storage medium can include, but is not limited to, any type of disk including floppy disks, optical disks, CD-ROMs, and magneto-optical disks, ROMs, RAMs, EPROMS, EEPROMs, magnet or optical cards, or any type of media suitable for storing electronic instructions.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regard in an illustrative rather than a restrictive sense.

What is claimed is:

1. An apparatus memory card, comprising:
   an interface configured to transfer data to and from a small form factor non-volatile memory card that can be removably coupled to the interface, the interface including:
   a first enable output configured to assert a first enable signal to the memory card, the first enable signal enabling access to a first non-volatile memory element within the memory card;
   a second enable output configured to assert a second enable signal to the memory card at a time when the first enable signal is not asserted, the second enable signal enabling access to a second non-volatile memory element within the memory card; and
   N data input/outputs (I/Os) for connecting to data pins of the first non-volatile memory element and to data pins of the second non-volatile memory element without a buffering element being interposed between the N data I/Os of the interface and the data pins of the first and second non-volatile memory elements.

2. The apparatus of claim 1, wherein a first one of the N data I/Os of the apparatus provides a first data signal to a first one in a first set of memory card data I/Os and a first one in a second set of memory card data I/Os, a second one of the N data I/Os of the apparatus provides a second data signal to a second one in the first set of memory card data I/Os and a second one in the second set of memory card data I/Os and so forth until an Nth one of the N data I/Os of the apparatus provides an nth data signal to an nth one in the first set of memory card data I/Os and a nth one in the second set of memory card data I/Os.

3. The apparatus of claim 1, wherein the apparatus further includes a flash manager that translates a request to access a logical sector of the non-volatile memory card into a request to access data in each of the first and second non-volatile memory elements within the memory card.

4. The apparatus of claim 1, further comprising a write output providing a write enable signal to the memory card and a read output providing an output enable signal to the memory card.

5. The apparatus of claim 1, further comprising K address outputs, the K address outputs provide K address signals to the memory card.

6. The apparatus of claim 1, wherein the memory card is a memory card that adheres to a Personal Computer Memory Card International Association (PCMCIA) standard.

7. The apparatus of claim 1, wherein the memory card is a Miniature Card and wherein the first and second non-volatile memory elements within the memory card are flash memory devices.

8. An interface to access data stored in a memory card, comprising:
   a control circuit providing a first signal and a second signal to the memory card, a first section of an addressed memory location within the memory card is selected in response to the first signal and an second section of the addressed memory location within the memory card is selected in response to the second signal, one of the first section and the second section of the addressed memory location is selected at a time; and
   a plurality of data inputs/outputs (I/Os) providing or receiving data stored in the selected one of the first section and the second section of the addressed memory location
   wherein the control circuit generates the first signal and the second signal each in response to a first address signal and a chip select signal; and
   wherein the control circuit includes an inverter and a first and a second OR gate, wherein the first address signal is provided to an input of the inverter and a first input of the second OR gate, an output of the inverter is coupled a first input of the first OR gate, the chip select signal is provided to a second input of the first OR gate and a second input of the second OR gate, an output of the first OR gate providing the first signal to the memory card, and an output of the second OR gate providing the second signal to the memory card.

9. An insertable memory card that is interchangeable with a system having an N-bit bus and a system having M×N-bit bus where M>2, comprising:
   a first memory element having N data input/output (I/O) pins;
   a second memory element having N data I/O pins;
   a first enable input coupled to enable access to the first memory element;
   a second enable input coupled to enable access to the second memory element, the first and the second enable inputs respectively receiving an asserted first enable signal and an asserted second enable signal concurrently when the insertable memory card is inserted into the system having the M×N-bit bus, the first enable input and the second enable input respectively receiving the asserted first enable signal and the asserted second enable signal at different times when inserted into the system having the N-bit bus and
   M×N data terminals connected to data pins of the first and second memory elements without a buffering element being interposed between the M×N data terminals and the data pins of the first and second memory elements.

11

10. The insertable memory card of claim 9, wherein a first section of an addressed memory location is accessed in response to the asserted first enable signal and a second section of an addressed memory location is accessed in response to the asserted second enable signal.

11. The insertable memory card of claim 10, wherein an even data byte is stored in the first section of the addressed memory location and an odd data byte is stored in the second section of the addressed memory location.

12. The insertable memory card of claim 9, wherein the insertable memory card is a small form factor memory card.

13. The insertable memory card of claim 9, wherein the insertable memory card is a Miniature Card having flash memory.

14. A method comprising the steps of:

asserting via an interface a first enable signal to a small form factor non-volatile memory card that is removably connected to the interface;

outputting from a first non-volatile memory component in the memory card in response to the first enable signal a first N-bit wide data value onto a first set of N conductors of an at least 2N-bit wide data bus included in the interface, there being no buffering element interposed between the first non-volatile memory component and the data bus of the interface to buffer the first data value prior to its output on the data bus of the interface;

12 asserting via the interface a second enable signal to the memory card; and outputting from a second non-volatile storage element in the memory card in response to the second enable signal a second N-bit wide data value onto a second set of N conductors of the at least 2N-bit wide data bus included in the interface, there being no buffering element interposed between the second non-volatile memory component and the data bus of the interface to buffer the second data value prior to its output on the data bus of the interface.

15. The method of claim 14 further comprising the step of translating in the host device a request to access a logical sector of the non-volatile memory card into a physical address that addresses the first and second N-bit wide data values in the memory card.

16. The method of claim 15 wherein data is organized in the non-volatile memory device according to a flash translation layer file format and wherein the step of translating the request to access a logical sector of the non-volatile memory card includes the step of executing program code in the host device to translate the request according to the flash translation layer file format.

\* \* \* \* \*